United States Patent [19]
Sukegawa et al.

[11] Patent Number: 5,235,165
[45] Date of Patent: Aug. 10, 1993

[54] SYSTEM FOR ISSUING RESIDENT CERTIFICATES

[75] Inventors: Norio Sukegawa, Yokohama; Masayuki Miyakawa, Niiza, both of Japan

[73] Assignees: Hitachi, Ltd.; Hitachi System Engineering, Ltd., Tokyo, Japan

[21] Appl. No.: 765,372

[22] Filed: Sep. 25, 1991

[30] Foreign Application Priority Data

Oct. 1, 1990 [JP] Japan .................................. 2-263326

[51] Int. Cl.⁵ .......................................... G06F 15/02
[52] U.S. Cl. ................................... 235/380; 235/381; 235/382
[58] Field of Search ......................... 235/380, 381, 382

[56] References Cited

U.S. PATENT DOCUMENTS

| 4,755,815 | 7/1988 | Savoyet et al. | 235/382 |
| 4,801,787 | 1/1989 | Suzuki | 235/382 |
| 5,056,141 | 10/1991 | Dyke | 235/380 |
| 5,136,644 | 8/1992 | Audebert et al. | 235/380 |

FOREIGN PATENT DOCUMENTS 52-50669 10/1975 Japan .
57-55468 2/1982 Japan .

Primary Examiner—William L. Sikes
Assistant Examiner—Scott A. Ouellette
Attorney, Agent, or Firm—Fay, Sharpe, Beall, Fagan, Minnich & McKee

[57] ABSTRACT

An automatic resident card dispensing system is provided in which in order to identify the user demanding the issue of a resident card, a question-and-answer session is held on the basis of the resident record data specific to the right user, and it is determined whether the user has entered correct answers to questions. When any of the answers is incorrect, the issue of the resident card is suspended. The system includes a resident record data base storing data items for issuing the resident card, a resident card dispensation processing section for issuing a resident card on the basis of the resident record data base, a display section for displaying questions and messages, an input section for entering answers to the questions displayed, and a user identification processing section for determining whether a right answer has been entered to each of the questions from the input section and suspending the issue of the resident card when any of the answers is incorrect.

6 Claims, 8 Drawing Sheets

SYSTEM FOR ISSUING RESIDENT CERTIFICATES

BACKGROUND OF THE INVENTION

The present invention relates to an automatic resident card dispensing system, or more in particular to an automatic resident card dispensing system capable of accurately identifying a person demanding the resident card as an authorized applicant and dispensing it by giving a question-and-answer session utilizing a resident record data specific to the particular applicant for identification.

Local self-governing bodies or local administration are required to process jobs at the window for issuing various certificates or the like documents including the resident card as a part of resident services. A conventional automatic resident card delivery system using office automation equipment has been developed in order not to deteriorate the window teller services in case the five-day work week system is introduced to self-governing bodies. This conventional automatic resident card delivery system is such that when a city dweller desiring the issue of his/her resident card inserts an identification card and enters his/her code number or password, the host computer in the municipal office connected to the automatic delivery system is accessed and identifies him/her, thereby automatically processing such operations as delivery of his/her resident card, payment of the fee and dispensing of the receipt.

In such an automatic resident card delivery system, however, the machine for automatic delivery is operated by the resident himself demanding the issue of a resident card, not by the staff of the municipality concerned. As a result, in order to prevent unauthorized issue or unlawful use of the resident card, it is necessary to positively determine that the person operating the automatic delivery machine who demands the issue of the resident card is the head or a relevent member of the household concerned.

According to the conventional automatic resident card delivery system described above, a magnetic card or IC card is used for identifying the user by entry of a password. In this method of user identification by an identification card, the resident card might be issued improperly if the identification card is acquired by a third party. Also, it would become necessary to deliver the identification card to all the residents of a particular municipality, thereby posing the problem of low reliability of system operation against improper issue or unlawful use of the resident card. JP-A- 52-50669 and JP-A-57-55468 disclose the related art.

SUMMARY OF THE INVENTION

The present invention has been developed to obviate the above-mentioned problem.

The object of the present invention is to provide an automatic resident card dispensing system for issuing a resident card after accurately identifying the user as a right applicant by a series of questions and answers based on the resident record specific to the right applicant.

In order to achieve the above-mentioned object, there is provided according to one aspect of the present invention, an automatic resident card dispensing system which comprises a resident record data base storing data items for issue of a resident card, a resident card dispensation processing section for issuing a resident card from the resident record data base, a display section for displaying questions and answers and messages, an input section for entering answers to the questions displayed, and a user identification processing section for producing questions for identifying the user demanding the issue of the resident card on the display section as a right applicant, determining whether a right answer has been entered against a given question from the input section and suspending the issue of the resident card in the case of a wrong answer.

As described above, the automatic resident card dispensing system according to the aspect of the present invention comprises a resident record data base, a resident card dispensation processing section, a display section, an input section and a user identification processing section. The resident record data base is for storing data items for issue of the resident card. The resident card dispensation processing section processes the steps for issuing a resident card on the basis of the data items of the resident record data base. The display section includes a display panel for displaying questions and answers and messages. The input section makes up a touch panel for entering an answer to each question. The display panel of the display section and the touch panel of the input section are installed in combination to permit the user to enter an answer to each question. The user identification processing section, on the other hand, produces questions for identifying the user demanding the issue of the resident card on the display section as a right applicant and determines whether the right answer has been entered against each question from the input section. In the case where an answer is wrong, the issue of the resident card is suspended, or as an alternative, the same question is produced a predetermined number of times, and the issue of the resident card is suspended if the question is repeatedly answered in a wrong way.

Questions for identifying the user demanding the issue of the resident card are created on the basis of the personal records of the household head and members making up data items of the resident record data base, and some questions are displayed on the display panel of the display section. The user enters answers to the questions by way of the touch panel. The resident card is not dispensed unless a predetermined number of questions are answered rightly. As a result, it is possible to determine accurately that the person demanding the resident card is either the head or a member of the household. The questions concern items of the resident record data of which only the head or members of the household may be informed, including the number of household members, the name, the date of birth, the present address and permanent domicile, the seal registration data, the national health insurance number and the national pension insurance number of the household head, etc. These data items are sampled at random for giving a question-and-answer session.

In this way, the user is identified not always by entry of a password and an identification card but by holding a question-and-answer session based on data items of the resident record which could be known only by the head or a member of the household. The improper issue of a resident card is thus positively prevented. Also, in the case where an identification card is used at the same time, illegal use of the identification card by a third party could be positively prevented.

DESCRIPTION OF THE PREFERRED EMBODIMENT

An embodiment of the present invention will be specifically described below with reference to the accompanying drawings.

Figure 1:
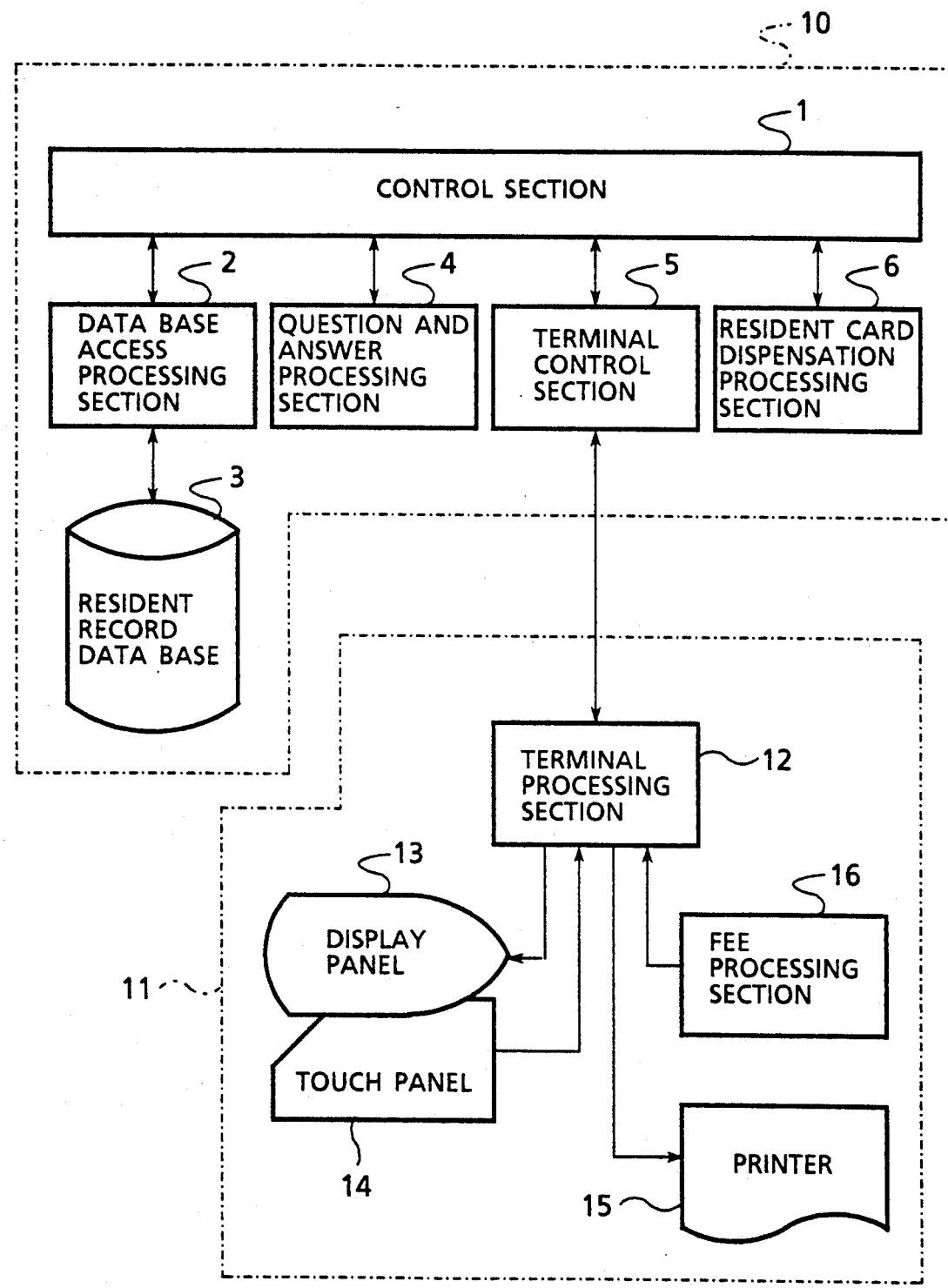
FIG. 1 is a block diagram showing a configuration of an automatic resident card dispensing system according to an embodiment of the present invention.

FIG. 1 shows in a block diagram a configuration of an automatic resident card dispensing system according to an embodiment of the present invention.

In FIG. 1, reference numeral 1 designates a control section, numeral 2 a data base access processing section, numeral 3 a resident record data base, numeral 4 a question and answer processing section, numeral 5 a terminal control section, and numeral 6 a resident card dispensation processing section. Numeral 10 designates a body of the automatic resident card dispensing system, numeral 11 a terminal section of the automatic resident card dispensing system, numeral 12 a terminal processing section, numeral 13 a display panel of the display section, numeral 14 a touch panel of the input section, numeral 15 a printer and numeral 16 a fee processing section.

The body 10 of the automatic resident card dispensing system is constructed by integrating various processing sections around the control section 1 for controlling the whole system. The resident record data base 3 stores data items of the resident record, each of which is accessed by the data base access processing section 2. The question and answer processing section 4 processes questions and answers for identifying the user. Specifically, the questions for identifying the person demanding the issue of the resident card are created from the data items of the resident record, and the questions and message thus created are produced on the display panel 13 from the terminal processing section 12 of the terminal section 11 of the automatic resident card dispensing system. It is then determined whether the right answer has been entered in response to a question from the input section of the touch panel 14. In the case where the answer is wrong, the same question is produced a predetermined number of times as described hereafter repeatedly thereby to process questions and answers for identifying the person demanding the issue. The terminal control section 5 controls the terminal section 11 of the automatic resident card dispensing system installed at a distance. The resident card dispensation processing section 6 is for issuing a resident card from the data items of the resident record data base 3 upon instructions from the control section 1. The resident card to be issued is applied to the printer 15 from the terminal processing section 12 of the terminal section 11 of the automatic resident card dispensation system through the control section 1 and the terminal control section 5.

The terminal section 11 of the automatic resident card dispensing system includes a terminal processing section 12 for controlling the automatic resident card dispenser, a display panel 13 making up the display section, a touch panel 14 of the input section, a printer 15 and a fee processing section 16 built around a terminal processing section 12 for controlling the automatic resident card dispenser. The display panel 13 is installed one over the other with the touch panel 14 for displaying questions and a message to permit the user to enter answers accurately from the touch panel in response to the display output. The fee processing section 16, on the other hand, includes a coin mechanism, a paper money verifier and a change calculator-dispenser for collecting the fee from the user.

Figure 2:
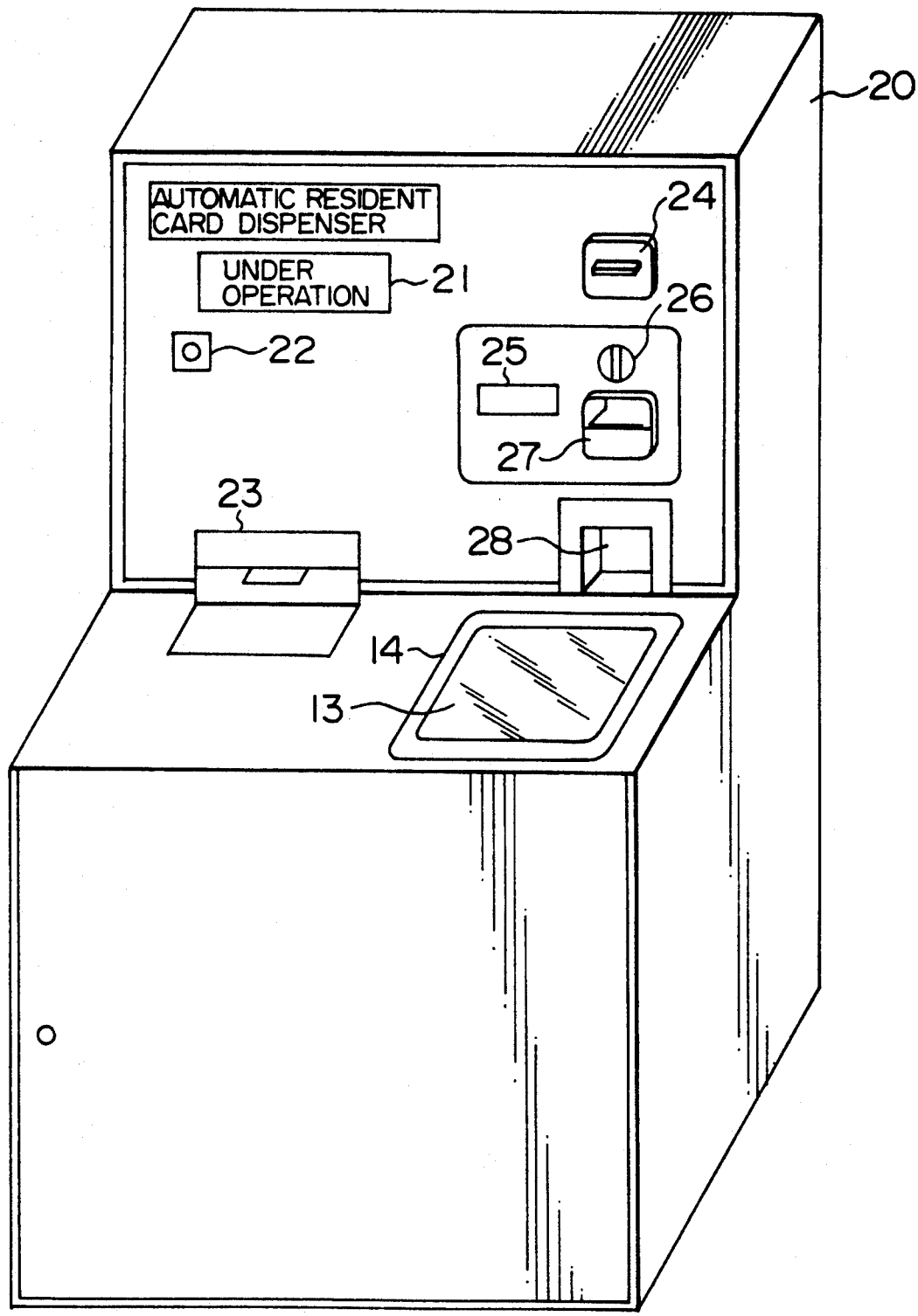
FIG. 2 is a perspective view of the appearance of an automatic resident card dispenser showing a configuration of the terminal section of the automatic resident card dispensing system.

FIG. 2 is a perspective view of the appearance of an automatic resident card dispenser showing a configuration of the terminal section 11 of an automatic resident card dispensing system.

In FIG. 2, numeral 13 designates a display panel, numeral 14 a touch panel, numeral 20 a body of an automatic resident card dispenser, numeral 21 an operation display panel, numeral 22 a staff call button in case of a trouble, numeral 23 an outlet of documents such as certificates and receipts, numeral 24 a card insertion slot, numeral 25 an amount display panel, numeral 26 a coin loading slot, numeral 27 a paper money loading port, and numeral 28 a change return port. As shown in FIG. 2, this automatic resident card dispenser, like a ticket vendor, comprises a coin mechanism, a money loading port of a paper money verifier, a change dispensation port, and other operation guide panels, which are arranged at positions easily accessible by the user.

In the case where the user demands the issue of a resident card by use of an automatic resident card dispenser of this automatic resident card dispensing system, the desired process is entered by touching a predetermined part of the touch panel in accordance with the message displayed on the display panel 13. The type of desired service is thus entered, the user identification process is effected by questions and answers, and the type and number of resident cards to be issued are entered. Then the coin or paper money is loaded, and the fee is paid in by the operation of the fee processing section 16, followed by automatic sequential processing of the issue of a receipt and delivery of a resident card.

Figure 3:
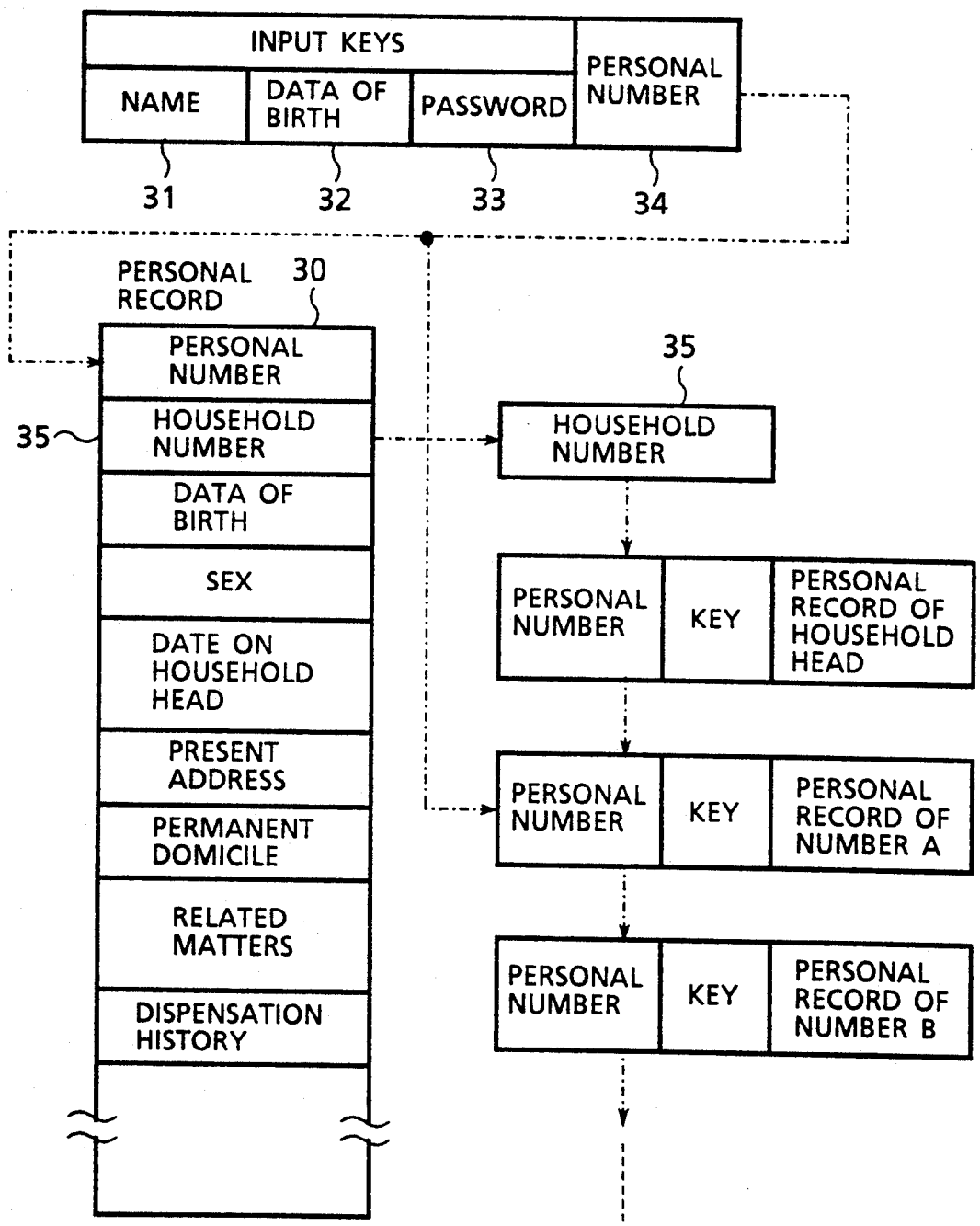
FIG. 3 is a diagram showing an example of record form of a resident record data in a resident record data base.

FIG. 3 shows an example of the record type of a resident record data of a resident record data base 3. As shown in FIG. 3, the personal record 30 of the resident record data base 3 is configured of data items including the personal number, household number, date of birth, sex, data on household head, present address, permanent domicile, and other referential data on related matters, as well as data items on dispensation or issue history. The personal record 30 is accessed through the personal number 34 with the name 31, the data of birth 32 and password 33 as input keys. The name 31 is that of the user. The configuration of household members is presented by coupling the personal records of the household head and household members to each other with the same household number 35 as a key. It is thus easy to extract the personal record of a person from his/her personal number and also the personal record of the whole household to which the particular person belongs, with the household number as a key.

Figure 4:
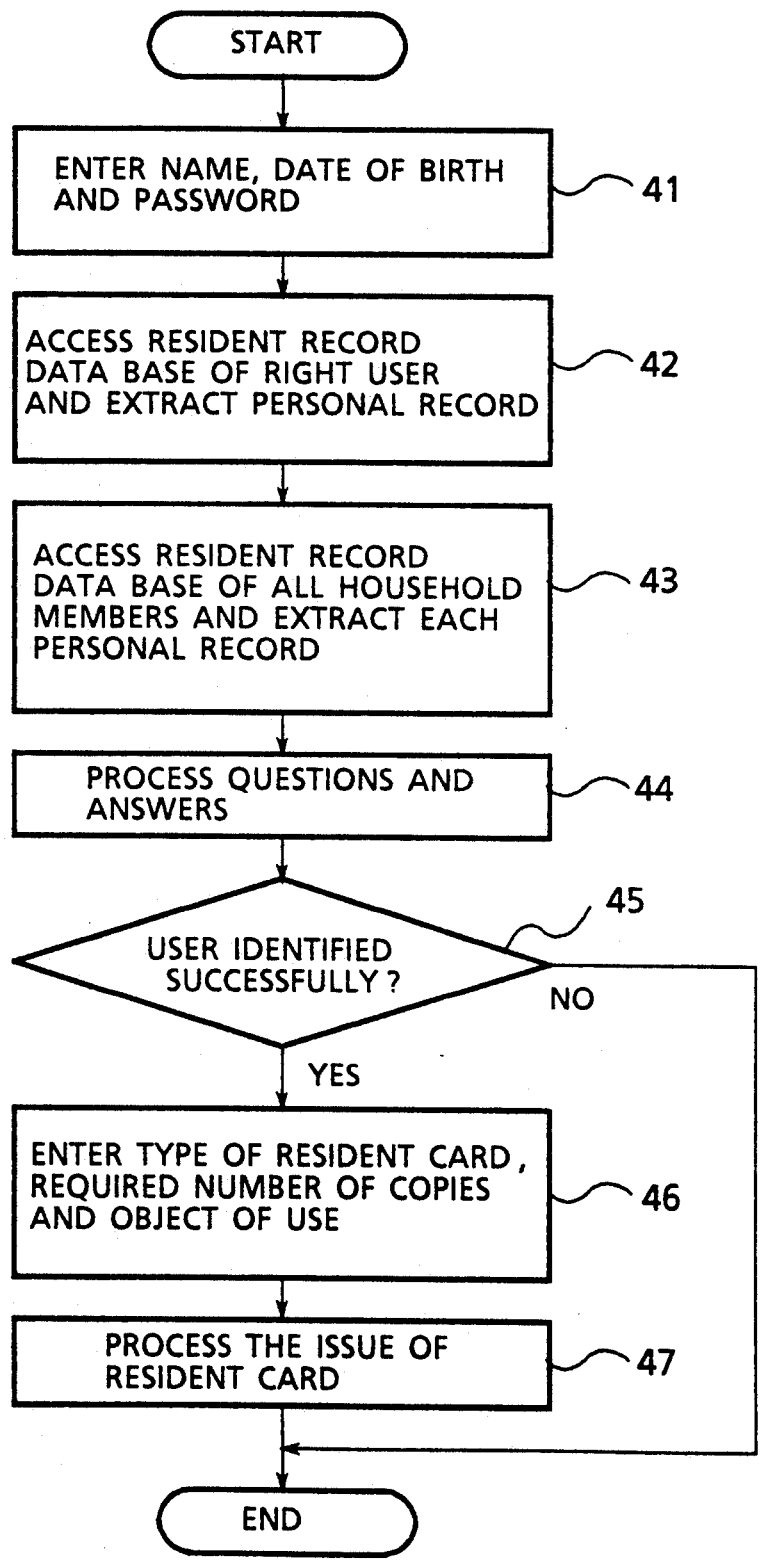
FIG. 4 is a flowchart for explaining the general flow of steps for issuing a resident card including the identification of the user by questions and answers.

FIG. 4 shows a flowchart for explaining a general flow of processing for dispensing or issuing a resident card including the identification of the user by questions and answers.

The whole processing operation will be explained with reference to FIG. 4. Assume that the user enters his/her demand of a resident card by way of the touch panel 14 in accordance with an initial guide display on the display panel 13. First, a step 41 causes the user to enter his/her name, data of birth and the password in order to access the personal record of the resident record data. This operation is performed by the control section 1 transmitting an entry request message to the terminal processing section 12 through the terminal control section 5. Specifically, a request for indicating a name entry message on the display panel 13 is transmitted in the first place. As a result, a message urging the user to enter his/her name is indicated on the display panel 13, thereby allowing the user to enter his/her name by way of the touch panel 14. After the entry of the name is confirmed, the control section 1 transmits a request to display the date-of-birth entry message on the display panel 13 to the terminal processing section 12 through the terminal control section 5. In response to this request, the user enters his/her date of birth by way of the touch panel 14. After the entry of the date of birth is confirmed, the control section 1 transmits a request for indicating a password entry message on the display panel 13 to the terminal processing section 12 through the terminal control section 5. In response to this request, the user enters his/her code number through the touch panel 14. After the entry of the password is confirmed, the step 41 is completed. Next, a step 42 accesses the resident record data base 3 through the data base access processing section 2 with the name, date of birth and code number i.e. password entered as keys, thereby extracting the related personal record 30 on the basis of the personal number 34.

Next, a step 43 extracts the personal record of all the household members from the related personal record of the resident record data base 3 with the household number providing an item of the extracted personal record as a key, followed by extraction of the personal record of all the household members. A step 44 is for processing questions and answers. More specifically, once the personal record of all the household members is extracted, questions are created by use of data items of the personal record of all the household members, followed by processing questions and answers with the control function transferred from the control section 1 to the question-and-answer processing section 4. The question-and-answer processing section 4 compiles the items of the record extracted in order to allow the user to determine whether he/she is the head or a member of the particular household, so that questions and answers are processed by use of the terminal processing section 12, the display panel 13 and the touch panel 14.

Next, a step 45 makes a determination on the result of the processing of questions and answers. In the case where a predetermined criterion is met, the process is passed to steps 46 and 47 for processing the issue of a resident card. Specifically, the step 46 enters the type of resident card, the number of resident cards required and the object of use thereof, followed by the step 47 for processing the issue of the resident card.

This process is started by the question-and-answer processing section 4 informing the control section 1 that it has been determined that the user is the head or a member of the household. The control section 1 transmits a request to the terminal processing section 12 through the terminal control section 5 to enter the output type (whether all or a part of the members of the household is covered) of the resident card, the number of resident cards required and the object of use thereof, and causes a message to be displayed on the display panel 13. Then, the data on each designated item is caused to be entered. The contents entered are confirmed, after which the control section 1 gives an instruction to the resident card dispensation processing section 6 to issue a resident card. A print data for issuing a resident card is sent to the terminal processing section 12, and the resident card is outputted and dispensed by being printed in the printer 15.

Now, the process for identifying the user at the question-and-answer processing section 4 will be explained.

Figure 5:
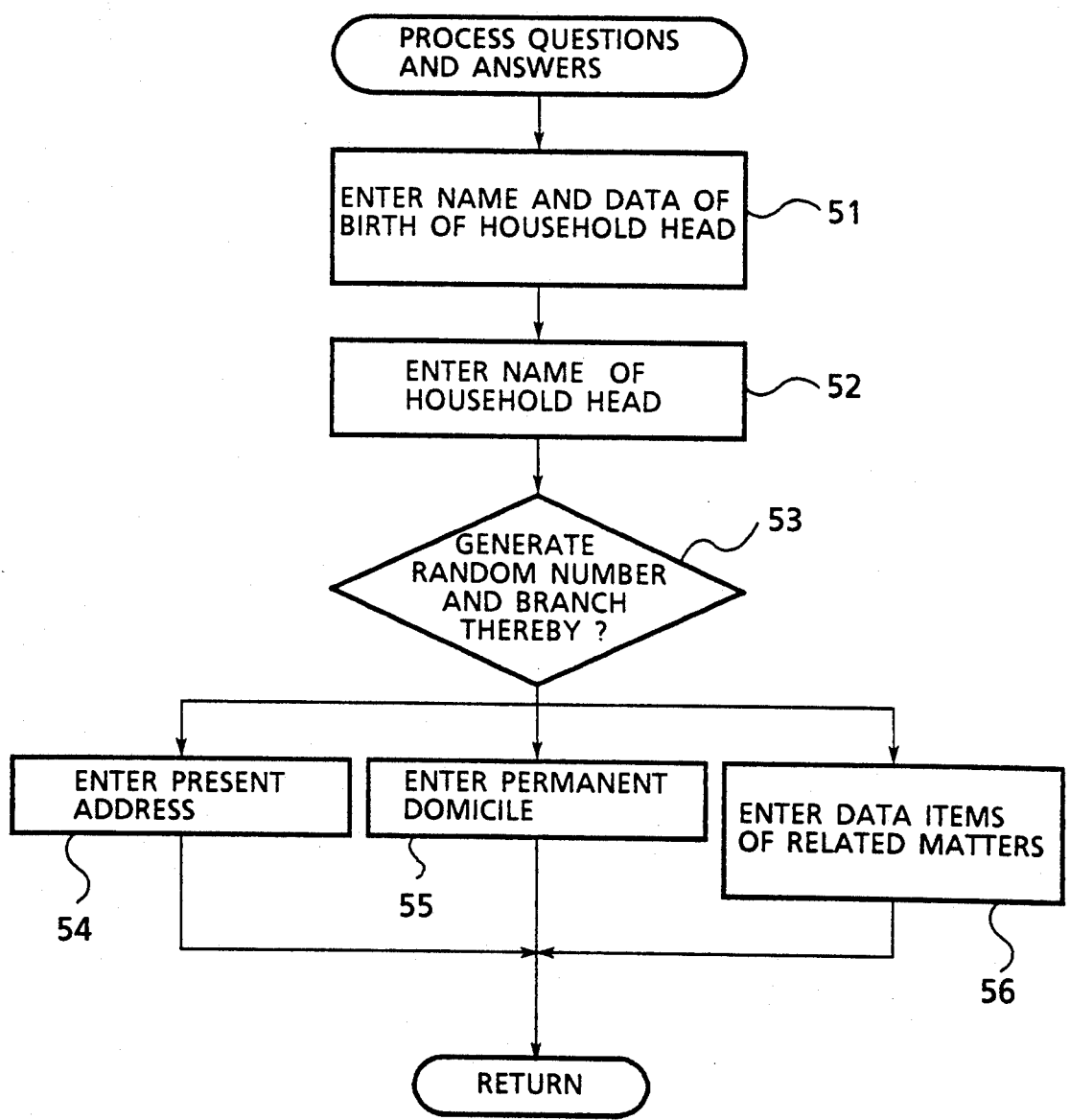
FIG. 5 is a flowchart showing a flow of operation for holding a question-and-answer session.

FIG. 5 shows a flowchart of the operation for processing questions and answers.

In the question-and-answer processing section 4, a step 51 first causes the user to enter the name and data of birth of the household head. On the basis of the personal record of all the household members extracted from this entry, the household structure is grasped, followed by a step 52 where the user is caused to enter the number of household members. In the case where the name and date of birth of the household head and the number of household members are entered rightly, the process proceeds to the next step of questions and answers. In the next question-and-answer process, step 53 generates a random number, and on the basis of the random number thus generated, the process branches to a step 54, 55 or 56. A step 54 processes questions and answers for causing the user to enter the present address rightly. A step 55 processes questions and answers for causing the user to enter his/her permanent domicile. Step 56 processes questions and answers for entry of data items of related matters (for example, seal registration data, national health insurance data and national pension insurance data in Japan). If these questions and answers are processed normally, it is determined that the user has been identified as a right person, and the process is passed to the next step.

In the above-mentioned question-and-answer session, the present address, permanent domicile and one of the data items are randomly extracted to hold a question-and-answer session. In this question-and-answer session, a data item is selected by random number in such a manner that the question is changed each time of operation of the automatic resident card dispenser.

Questions are not limited to the items mentioned above, but are preferably ones which could be answered only by the head or members of the household and as easily as possible on the basis of the data contained in the resident record data base.

For the processing of questions and answers, a criterion is set for user identification. For example, both the name and date of birth of the household head must be accurate, and so is the number of household members. Also, the current address and the permanent domicile are assumed to have been entered rightly if they are correct up to the town name. In this way, a criterion is set for each question item. All the essential questions are required to be answered correctly. As for questions on related matters, however, a criterion is set in such a manner that the user is assumed to have been correctly identified by answering at least a predetermined number of questions correctly. In view of the fact that even the right user may make error in entry operation, reentry is allowed up to a predetermined number of times when answers are erroneous.

In the case of questions on the name and data of birth of the household head and the number of household members, the user may alternatively be caused to select the right one from among a plurality of possible answers on the display panel 13 to reduce the input error for an improved machine operability.

Figure 6A:
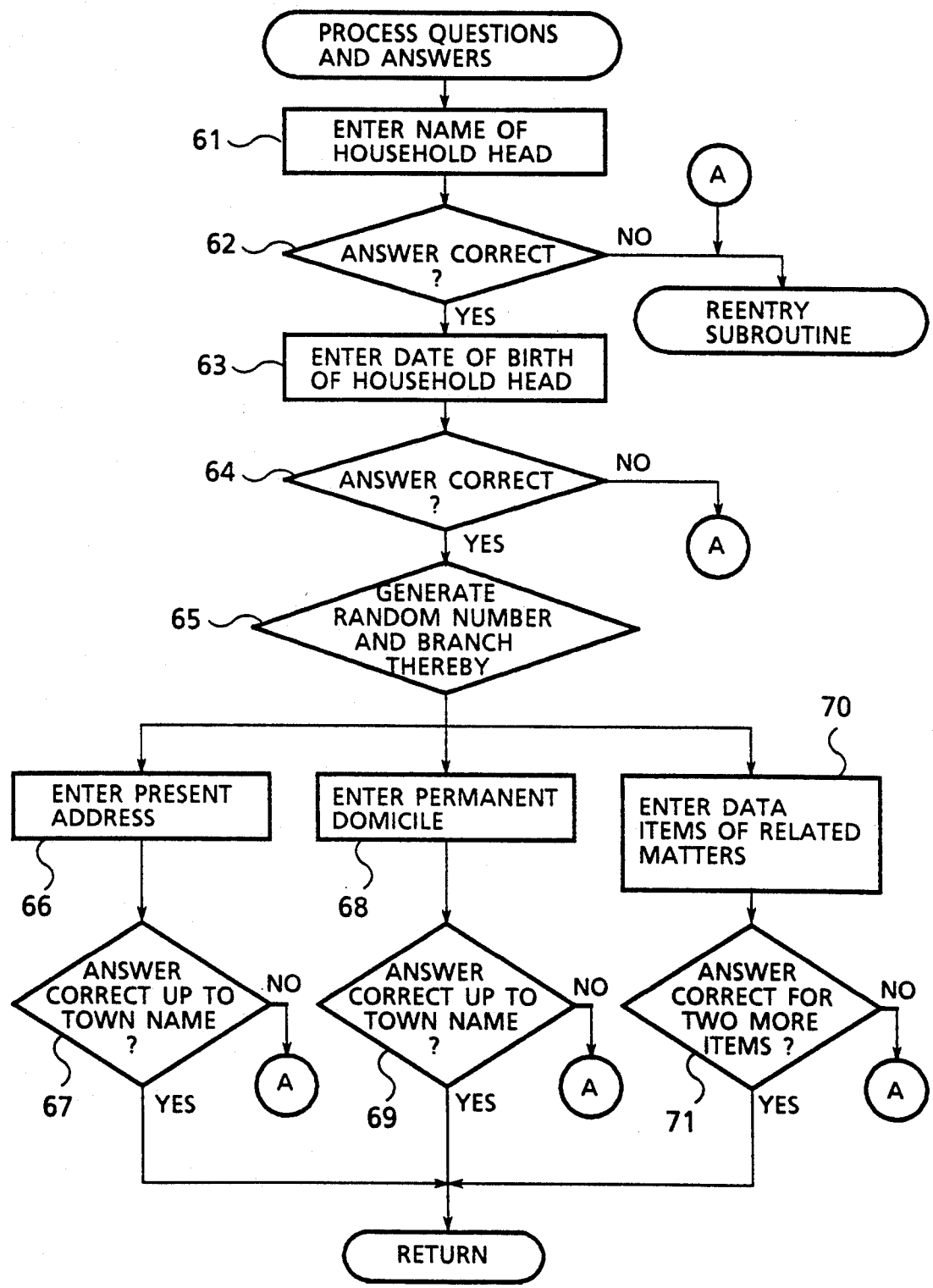
FIGS. 6A and 6B are flowcharts showing another example of the flow of operation for a question-and-answer session.
Figure 6B:
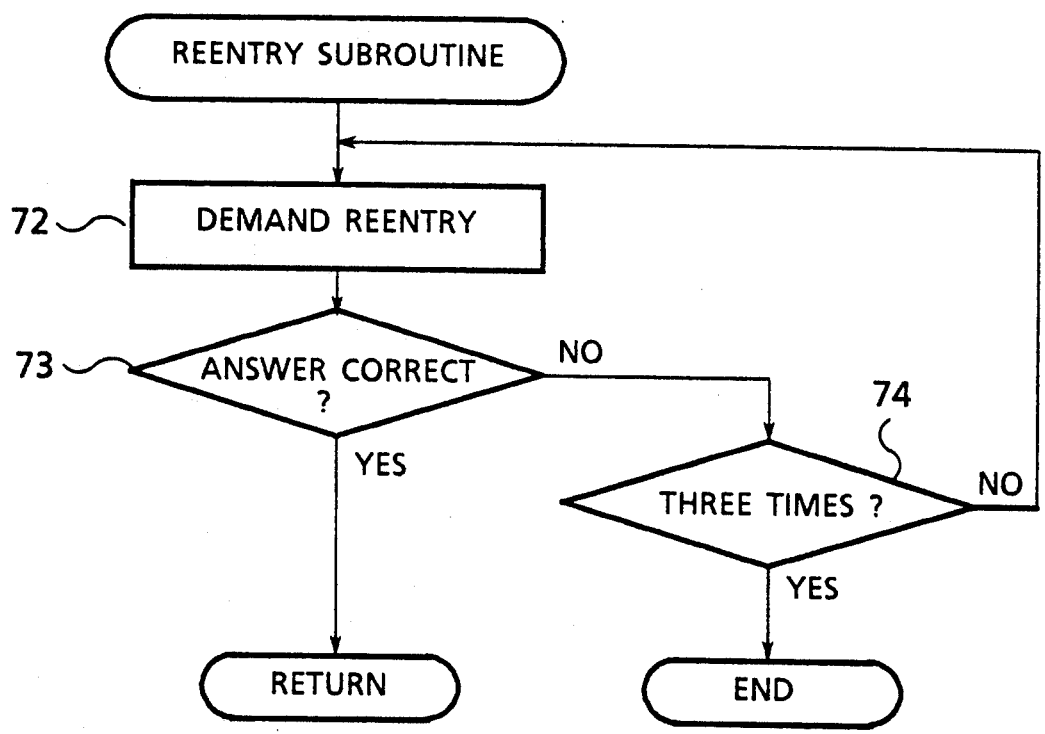

Another example of operation of processing questions and answers is shown in the flowcharts of FIGS. 6A and 6B.

In this question-and-answer processing operation, a step 61 causes the user to enter the name of the household head, and a step 62 determines whether the answer is correct or not. If the answer is not correct at the step 62, the process proceeds to a reentry subroutine (FIG. 6B), so that step 72 demands reentry. Step 73 determines whether the answer is correct or not again. If the answer is correct, the process is returned to the steps of the original routine. In the case where the answer is incorrect, on the other hand, step 74 determines whether the particular question is answered incorrectly three times, and if the question is answered incorrectly less than three times, the process returns to step 72 to repeat the steps starting with reentry demand. If the question is answered incorrectly three times, by contrast, the question-and-answer session is completed determining that the user identification has failed.

When the step 62 determines that the name of the household head is entered correctly, or when the name of the household head reentered in the reentry subroutine is correct, on the other hand, the process is returned to step 63 to cause the user to enter the date of birth of the household head. Step 64 determines whether the entry of date of birth of the household head is correct or not. If the answer is not correct, the process proceeds to the reentry subroutine as in the afore-mentioned case to reenter the date of birth of the household head. If the answer is incorrect three times or more, the question-and-answer session is terminated, determining that the user cannot be identified as a right applicant. When the entry of the date of birth of the household head is correct, the process is passed to a step 65 for generating a random number, and on the basis of the random number thus generated, the process branches to a step 66, 68 or 70. Step 66 processes questions and answers for entering the correct current address, and step 67 determines whether the entry of the present address is correct up to the town name. If the entry is not so correct, the process proceeds to the reentry subroutine (FIG. 6B) as in the previous case, where the present address is reentered. If the answer is entered incorrectly three times or more, the question-and-answer session is completed, determining that the user cannot be identified as a right applicant. Step 68 processes questions and answers for correct entry of the permanent domicile. Step 69 determines whether the entry of the permanent domicile is correct up to the town name. If the answer is not so correct, the process is passed to the reentry subroutine (FIG. 6B) as in the previous case for reentry of the permanent domicile. In the case where the answer is incorrectly entered three times or more, the question-and-answer session is terminated, and it is determined that the user cannot be identified as a right applicant. Step 70, on the other hand, processes questions and answers for causing the entry of data items of related matters (seal registration data, national health insurance data and national pension insurance data). In this case, step 71 determines whether the entry is correct for at least two data items. If the entry is not so correct, the process proceeds to the reentry subroutine (FIG. 6B) as in the previous case, where the data on the related matters are reentered to determine a right answer. If the answer reentered is incorrect at least three times, the question-and-answer session is ended, thereby determining that the user cannot be identified successfully. When these questions and answers are normally processed and the entry is determined to be correct, the process is passed to determine that the user has been correctly identified, thereby terminating the whole process.

As described above, according to the automatic resident card dispensing system under consideration, the only thing required of the user is to answer questions produced from the system by entry through the touch panel in accordance with the screen message indicated on the display panel. It is therefore possible to proceed easily with the entry operation.

Figure 7:
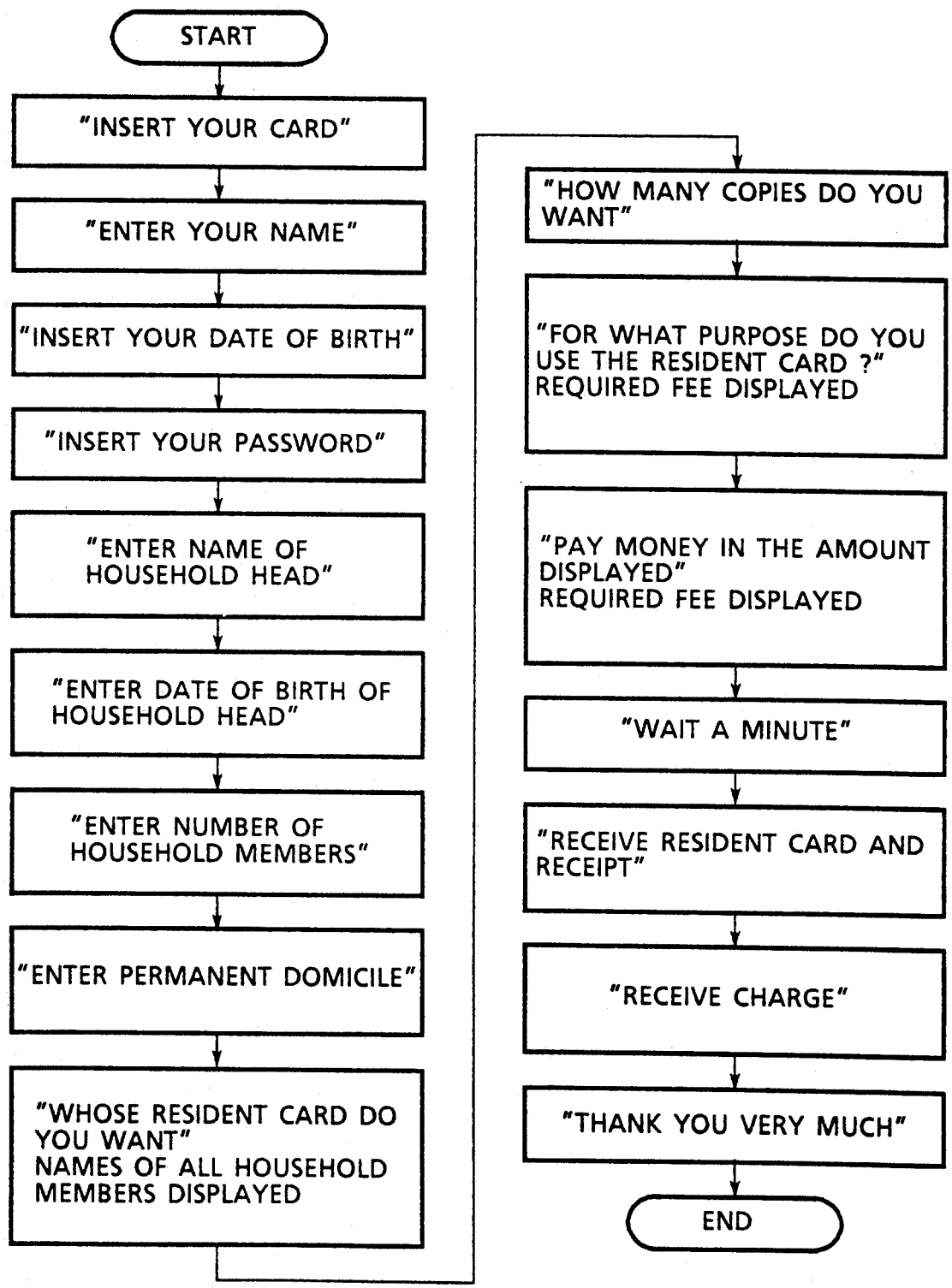
FIG. 7 is a diagram showing an example of the transition of display on the display panel as a flow of steps from start of the process to the issue of the resident card.

FIG. 7 shows in a diagram a flow of steps from the start of processing to the issue of a resident card as an example of screen scrolling on the display panel. An example of screen scrolling of a message before the issue of a resident card to the user will be explained with reference to FIG. 7. As described above, questions are given at random in the question-and-answer session for user identification, and therefore the screen message is not always scrolled in the manner shown in FIG. 7.

The message "Insert your identification card" is initially displayed on the screen. After the user inserts his/her identification card in compliance with the screen message, the screen message scrolls to "Enter your name". When the user enters his/her name, the screen message changes to "Enter your date of birth". Upon entry of the date of birth, the screen message "Enter your password" appears. When the password is entered, a question-and-answer session is started for user identification with the display of the message "Enter the name of the household head". When the user enters the name of the household head in accordance with the screen message, the next screen message "Enter the date of birth of the household head" appears. Further, upon entry of the date of birth of the household head by the user, the message is replaced by "Enter the number of household members". Upon entry of the number of household members, the screen message changes to "Enter the permanent domicile". When the permanent domicile is entered correctly, the questions and answers for identifying the user are completed, and the process proceeds to the issue of an appropriate resident card. The message display on the screen for processing the issue of a resident card is "Whose resident card do you want", while the names of all the household members are displayed on the display panel 13 at the same time. As a result, the user is permitted to select the name of the household member whose resident card is wanted, from among all the household members displayed on the screen. Upon completion of selection, the next screen message "How many copies do you want". When the user enters the required number of copies, the message changes to "For what purpose do you want the resident card", while several possible objects of use are displayed on the display panel together with the corresponding numbers in menu form. The user selects the number for one of the objects. The process is then passed to the fee collection steps, with the message changing to "Pay the fee in the amount displayed". The user pays in the fee in the amount displayed. Upon complete processing of fee collection, the message "Wait a minute" appears, indicating that the process for issuing a resident card is going on. When the process for issuing a resident card is complete, the screen display changes to "Receive the resident card and the receipt", to "Receive the change", and finally to "Thank you very much" as an ending message, thereby completing the whole process.

In an automatic resident card dispensing system according to the present embodiment, as explained above, it is possible to issue a resident card without any identification card. Further, if any identification card is made usable, the illegal use of an identification card of a third party is prevented.

By using the automatic resident card dispensing system according to the present embodiment, the complicated window services of local self-governing bodies are rationalized, thereby making it possible to meet the five-day workweek system without deteriorating the services to residents.

The present invention is not limited to the embodiment specifically described above, but may be modified in various ways without departing from the spirit of the invention.

As will be understood from the foregoing description, according to the feature of the present invention, there is provided an automatic resident card dispensing system in which the user is identified not by entry of an identification card and a pasword but by holding a question-and-answer session on data items of the resident record which could be known only by a household member. It is thus possible to prevent the unauthorized issue of a resident card positively. Further, when the identification card is used at the same time, it is also possible to prevent the illegal acquisition of the resident card by the identification card of a third party. Also, since the user can be identified easily and positively, there is no need of the staff of the municipality to attend the user, thereby making it possible to issue the resident card even on Saturday and Sunday. Furthermore, the efficiency of window services is improved during the business hours of each local self-governing body.

We claim:

1. An automatic resident card dispensing system comprising a central unit and a terminal unit connected to said central unit,
    said terminal unit including:
        a display section for displaying questions;
        an input section for entering answers to the questions displayed on said display section; and,
        a print section for printing a resident card;
    said central unit including:
        a resident record data base holding resident records of data items comprising personal information on the user and personal information on the user's family;
        a resident card dispensing section for issuing the resident card on the basis of said resident records of the resident record data base and for sending the resident card to the print section of the terminal unit to be printed out; and,
        a user identification processing section for producing questions associated with said data items, sending the questions to said display section of said terminal unit, receiving answers to said sent questions from said input section, comparing the received answers with the data items held in said resident record data base and activating the resident card dispensing section when the answers are consistent with the data items.

2. The automatic resident card dispensing system according to claim 1, wherein said display section includes a display panel for displaying questions and messages, said input section includes a touch panel for entering answers to the questions, and said display panel of the display section and said touch panel of the input section are installed in combination with each other, thereby permitting the user to enter the answer accurately to each of the questions.

3. The automatic resident card dispensing system according to claim 1, wherein said user identification processing section includes means for creating questions for identifying the user requesting the issue of the resident card on the basis of the resident record data base, means for producing questions thus created to the display section, means for determining whether a right answer has been entered from the input section to each of the questions, means for producing the same question a predetermined number of times when the answer is determined wrong, and means for suspending the issue of the resident card when the question is repeatedly answered incorrectly.

4. The automatic resident card dispensing system according to claim 1, wherein said user identification processing section includes means for creating questions for identifying the user demanding the issue of a resident card as a right applicant on the basis of the resident record data base, means for producing the created questions at random to the display section, means for deciding whether a right answer has been entered from the input section, means for producing different questions sequentially to the display section, and means for suspending the issue of the resident card in the case where a predetermined number of questions are answered incorrectly.

5. The automatic resident card dispensing system according to claim 1, wherein said user identification processing section includes means for acquiring the data items of questions from the resident record data base for identifying the user demanding the issue of the resident card as a right applicant, means for producing questions on a name and date of birth of the user to the display section, means for producing the questions of the data items from the resident record data base relating to the user demanding the issue of the resident card in the case where a right answer has been entered from the input section to each of the questions on the name and data of birth of the user, means for determining whether a right answer has been entered from the input section to each of the questions of the data items, means for producing the same question a predetermined number of times when the answer is determined incorrect, and means for suspending the issue of the resident card when the answer is repeatedly correct.

6. The automatic resident card dispensing system according to claim 1, wherein said user identification processing section includes means for acquiring the data items on the questions for identifying the user demanding the issue of the resident card as a right applicant from the resident record data base, means for producing the display section questions essential for identifying the user, means for determining whether a right answer has been entered from the input section to each of the essential questions, and means for suspending the issue of the resident card immediately when any one of the essential questions is answered incorrectly.

* * * * *

UNITED STATES PATENT AND TRADEMARK OFFICE
CERTIFICATE OF CORRECTION

PATENT NO. : 5,235,165

DATED : August 10, 1993

INVENTOR(S) : Norio Sukegawa, et al.

It is certified that error appears in the above-identified patent and that said Letters Patent is hereby corrected as shown below:

Claim 4, column 10, line 39, after "answer" insert --to the question--.

Signed and Sealed this

Fifteenth Day of March, 1994

*Attest:*

BRUCE LEHMAN

*Attesting Officer*     *Commissioner of Patents and Trademarks*